United States Patent [19]

Deffayet

[11] Patent Number: 5,044,156

[45] Date of Patent: Sep. 3, 1991

[54] DEVICE DESIGNED TO MODIFY THE TRAJECTORY OF A PROJECTILE BY PYROTECHNICAL THRUSTERS

[75] Inventor: Jean Deffayet, Chaville, France

[73] Assignee: Thomson-Brandt Armements, Boulogne Billancourt, France

[21] Appl. No.: 363,856

[22] Filed: Jun. 9, 1989

[30] Foreign Application Priority Data

Jun. 10, 1988 [FR] France ............................... 88 07768

[51] Int. Cl.[5] .......................... F02K 9/00; F24B 10/00

[52] U.S. Cl. .......................................... 60/225; 60/229; 60/253; 244/3.22

[58] Field of Search ................. 60/253, 229, 225, 233; 244/3.22; 102/374, 381

[56] References Cited

U.S. PATENT DOCUMENTS

| | | | |
|---|---|---|---|
| H236 | 3/1987 | Maykut | 244/3.22 |
| 2,613,497 | 10/1957 | MacDonald | 60/229 |
| 3,034,434 | 5/1962 | Swaim et al. | 244/3.22 |
| 3,069,846 | 12/1962 | Buescher . | |
| 3,099,960 | 8/1963 | Bryan | 60/229 |
| 3,263,419 | 8/1966 | Schmitz . | |
| 3,316,719 | 5/1967 | Loprete | 60/225 |
| 3,328,962 | 7/1967 | De Feo et al. | 60/225 |
| 3,380,661 | 4/1968 | Markowski | 60/229 |
| 3,532,297 | 10/1970 | Maes | 60/229 |
| 4,408,735 | 10/1983 | Metz | 244/3.22 |
| 4,444,119 | 4/1984 | Caponi | 244/3.22 |
| 4,689,845 | 9/1987 | Stessen | 60/253 |
| 4,726,544 | 2/1988 | Unterstein | 244/3.22 |

FOREIGN PATENT DOCUMENTS

| | | | |
|---|---|---|---|
| 0015216 | 9/1980 | European Pat. Off. . | |
| 0229541 | 7/1987 | European Pat. Off. . | |
| 3708312 | 9/1988 | Fed. Rep. of Germany | 244/3.22 |
| 2367659 | 5/1978 | France | 244/3.22 |

*Primary Examiner*—Louis J. Casaregola
*Assistant Examiner*—Timothy S. Thorpe
*Attorney, Agent, or Firm*—Oblon, Spivak, McClelland, Maier & Neustadt

[57] ABSTRACT

The invention concerns a device designed to modify the trajectory of a projectile by pyrotechnical thrusters, formed by several solid propellant thrusters arranged transversally on a cylindrical support. The combustion chambers, instead of having a cylindrical shape, are parallelepiped shaped. They contain propellant loads which are gone through by a rod connecting a streamlined to the support. The streamlined and the support are cut up to realize nozzles which allow the ejection of gas, the gas coming from the combustion of the propellant load. Thus for a given thickness (e) of the support, a greater loading volume is obtained than that which would be obtained with standard, cylinder-shaped thrusters.

10 Claims, 4 Drawing Sheets

DEVICE DESIGNED TO MODIFY THE TRAJECTORY OF A PROJECTILE BY PYROTECHNICAL THRUSTERS

BACKGROUND OF THE INVENTION

1. Field of the Invention

The invention concerns a device designed to modify the trajectory of a projectile by pyrotechnical thrusters.

2. Description of the Prior Art

It is known that the trajectory of a projectile can be modified by means of transversal jets of gas using solid propellants.

One problem arises with respect to the low amount of space available for placing these thrusters. For, in the prior art, these thrusters take the form of powder-based thrusters having a cylindrical combustion chamber. Now, the positioning of these thrusters is often restricted, in the projectile, to a section of a few centimeters thick for diameters of some decimeters. Since these thrusters are arranged crosswise with respect to the axis of the projectile, their diameter is restricted by the thickness of the available section and by the contact with the neighbouring thrusters.

The present invention is aimed at overcoming these drawbacks and concerns a new thruster architecture designed to correct the trajectory of a projectile, an architecture which results in the ability to have a total propellant load which is the maximum for the small free volume reserved for this function in the projectile.

SUMMARY OF THE INVENTION

More precisely, the invention concerns a device designed to modify the trajectory of a projectile by pyrotechnical thrusters, formed by several solid propellant spaced thrusters, for forming combustion jets which give guidance thrusts that ensure the modification, the thrusters being circumferentially arranged on a support shaped like a cylinder section, centered with respect to the axis of the projectile, a device wherein each of the thrusters is formed by a housing, at least one base of which is rectangular, containing the propellant load and having an extruded nozzle center body fixed to the support so as to form at least one nozzle enabling an orientation of the thrust.

BRIEF DESCRIPTION OF THE DRAWINGS

The invention will be better understood from the following explanations and the appended figures, of which.

For greater clarity, the same references are repeated for the same elements for all the figures.

DESCRIPTION OF PREFERRED EMBODIMENTS

The present invention concerns a structure and an installing of thrusters giving transversal jets for projectile guidance, enabling the maximum use of the volume of the section available for this function.

According to a major characteristic of the invention, instead of having a cylindrical shape, the combustion chambers of the thrusters, namely cases containing the propellant load, have a rectangular base or face having a rectangular surface and a parallelepiped shape or a more complex derived shape.

According to another characteristic of the invention, this architecture leads to the installing, for each thruster, of a nozzle with a particular geometry.

Figure 1:
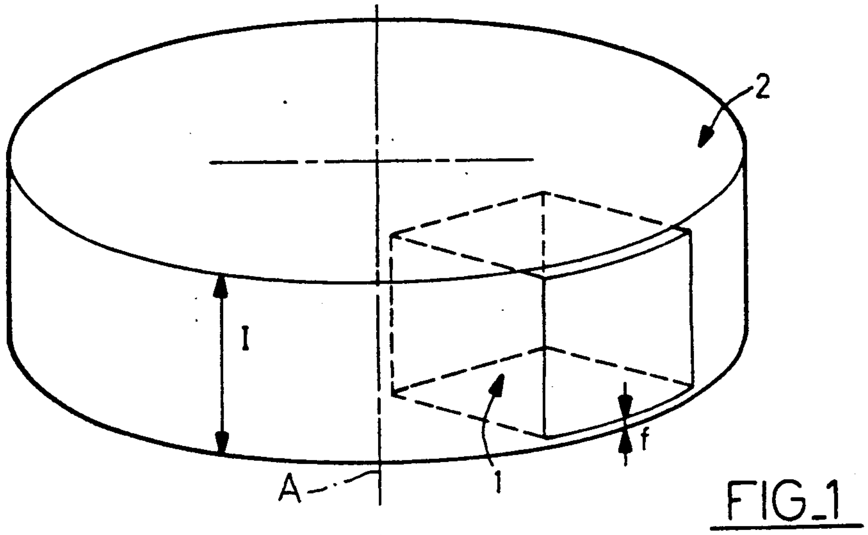
FIGS. 1 and 2 illustrate the architecture for the positioning of the thrusters according to the invention.

According to one embodiment illustrated by means of FIG. 1, the housings of the combustion chambers (1), which are parallelepipeds, may result from molding, done directly, in the support (2) which acts as a support for the thrusters, these thrusters being, as stated above, powder-based thrusters and being centered with respect to the central axis A of the projectile. The term "chamber" is used herein because the loading is done within a housing that is an integral part of the support (2).

During the molding process, a partition is set aside. The thickness (f) of this partition is small, and this smallness varies according to whether or not the faces perpendicular to the axis of the projectile are supported on a strong structure. Only one chamber is shown in the figure, but there are actually several chambers arranged crosswise.

Figure 2:
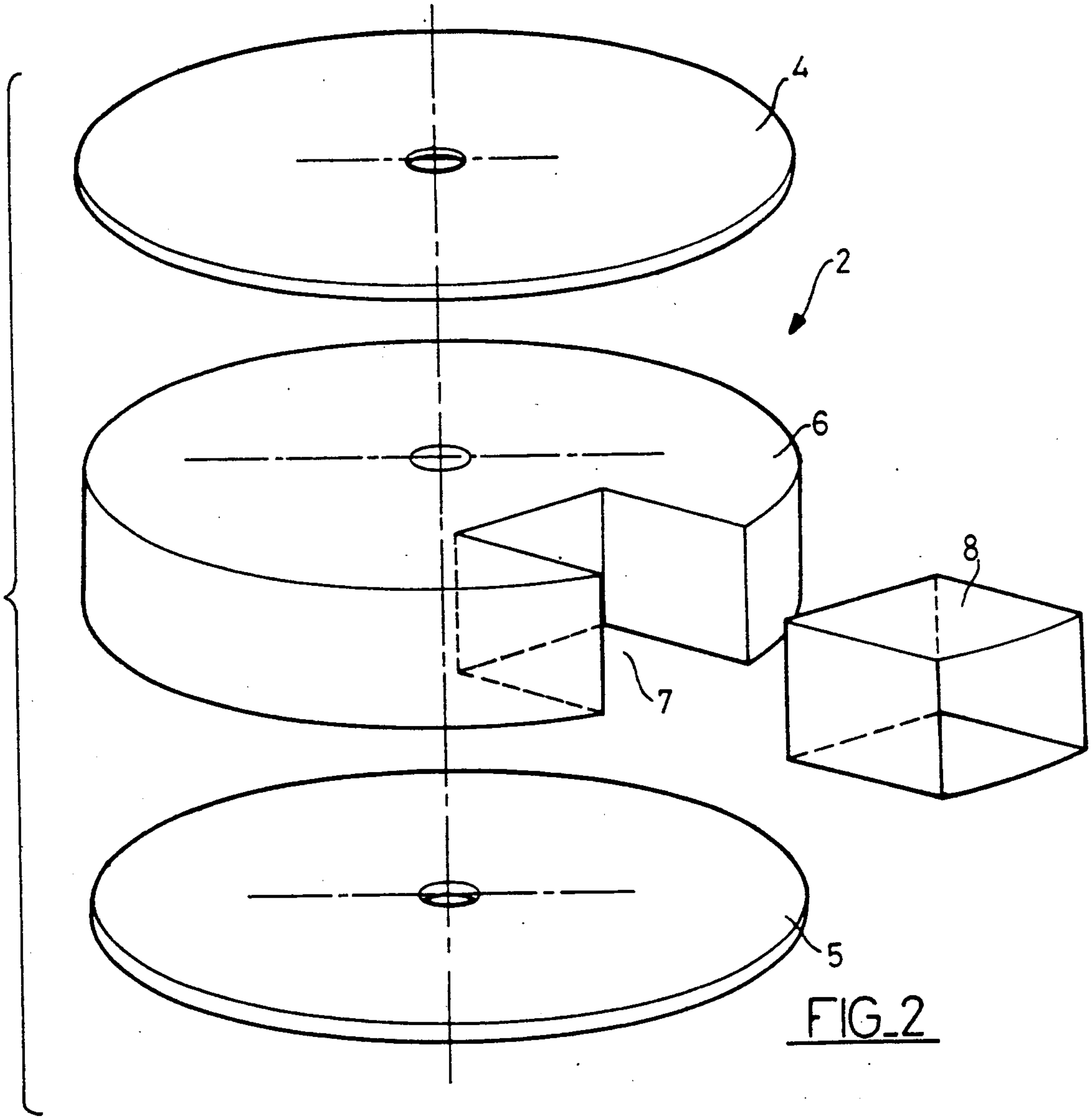

According to another variant, illustrated by means of FIG. 2, the support (2), with a thickness (e) corresponding to the thickness of the projectile section available for the guidance function, is made from machined parts. In FIG. 2, these parts are shown as being separate, and it is their stacking that forms the support (2) with a thickness (e). This support (2) is formed, for example, by a roller (6) having several cut-out parts such as (7), made transversally on the rim of the roller (6). These cut-out parts form housings, each designed to take a thin, parallelepiped-shaped case (8) made of a heat-resisting material and having dimensions that match those of the corresponding housing. Two flanges (4) and (5) secure the cases (8) in their respective housings (7). These cases (8) receive the load of propellant (not shown) and form the trajectory modifying thruster. The term "chamber" (1) or "case" (8) actually covers the volume occupied by the propellant load which is why it is given the general name of a cases. (1, 8). Whether for the first alternative or for the second one, it is clearly possible to consider the standard construction of convergent-divergent nozzles of a cylindrical shape, but it is hard to transpose it to the above-described architecture.

Figure 3:
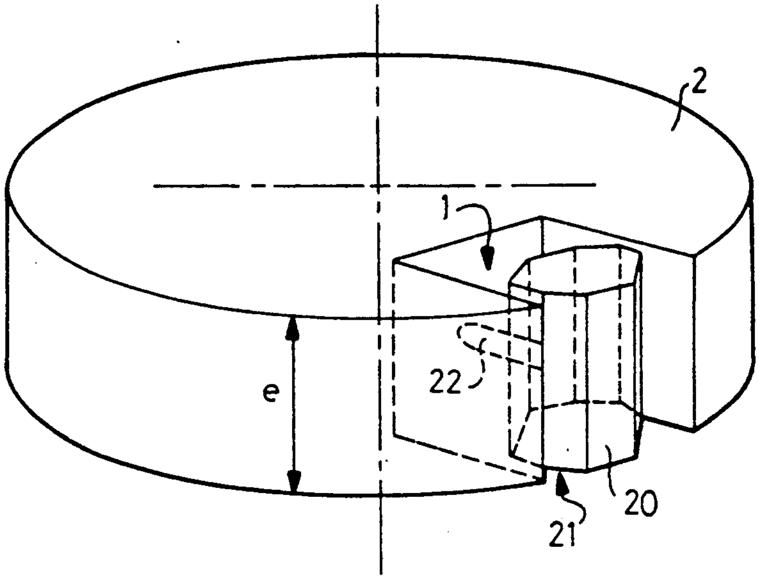
FIG. 3 illustrates an example of a nozzle adapted to the configuration of the thrusters according to the invention.
Figure 4:
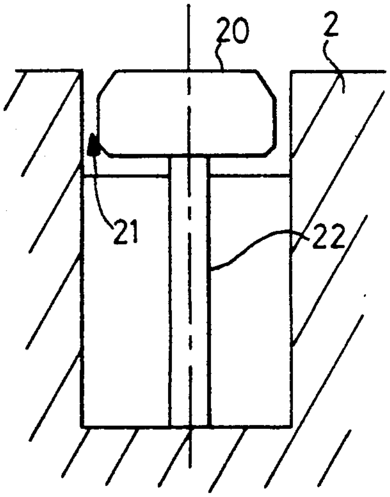
FIGS. 4 and 5 illustrate an additional function accomplished by the nozzle-attachment means illustrated in FIG. 3.

According to one characteristic of the invention, as shown in FIG. 3, an extruded nozzle center body (20) is fixed to the support (2) so as to form a nozzle (21) which can be seen more clearly in FIG. 4. The extruded nozzle center body 20 can be obtained through extrusion and defines a body in which a section defines the same shape along the length of the body. Its fixing is achieved by means of a rod (22) which goes through the propellant load and can withstand the traction that results from the internal pressure of combustion.

Figure 5:
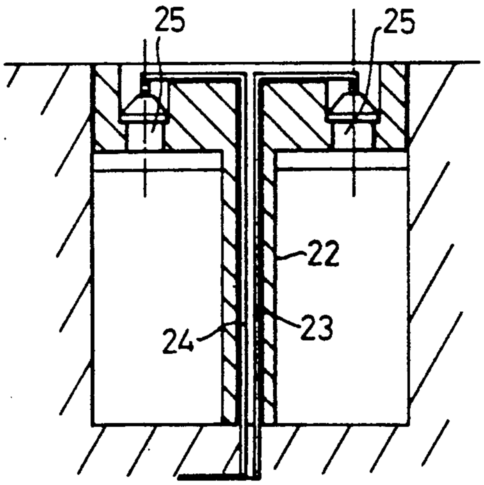

According to another characteristic of the invention, as shown in FIG. 5, this rod (22) is hollow and acts as a passage for the electrical conductors (23, 24) that fire the ignition elements (25) housed, for example, in the extruded nozzle center body (20).

Figure 6:
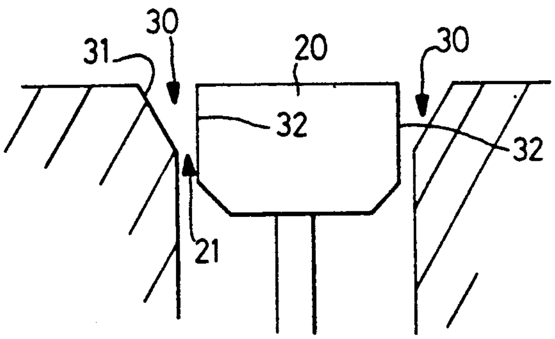
FIGS. 6, 7, and 8 illustrate embodiments of nozzles according to the invention.
Figure 9:
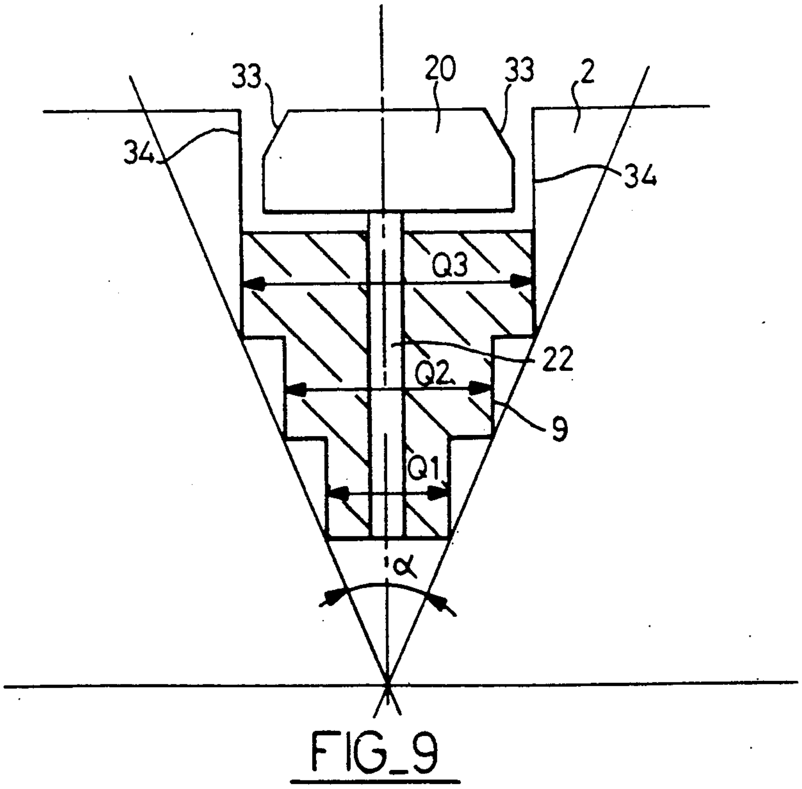
FIG. 9 illustrates another example of propellant loading according to the invention.

Several alternative embodiments of divergent parts (30) for these nozzles (21) can be chosen. As shown in FIG. 6, the divergent part (30) can be obtained by making a chamfer (31) at the entrance to the housing of the thruster, working together with a straight part (32) of the extruded nozzle center body (20), or vice versa (34, 33) as shown in FIG. 9.

Figure 7:
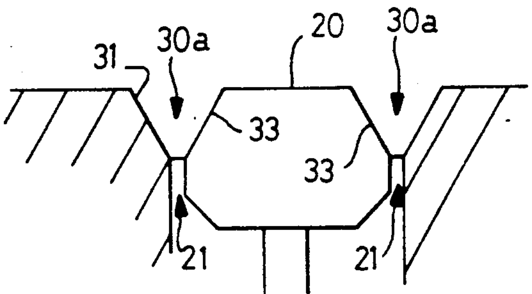

As shown in FIG. 7, this divergent part (30*a*) is obtained by combining the presence of a chamfer (31) at the entrance to the, housing with an inclined plane (33) given to the extruded nozzle center body (20). These shapes of divergent parts lead to the obtaining of cross thrusts.

Figure 8:
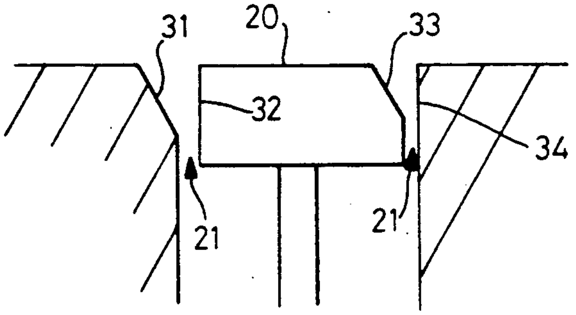

On the other hand, as shown in FIG. 8, it is possible to obtain thrusts in different directions by using nozzles (21) having dissymetrical shapes combining both the above solutions, namely, on the one hand, a chamfer (31) working together with a straight part (32) of the extruded nozzle center body (20) and, on the other hand, a straight section (34) on the housing side, working together with an inclined plane (33) made on the extruded nozzle center body (20).

According to another characteristic of the invention, it is possible, depending on the arrangement of the axis of the extruded nozzle center body (20), to obtain rolling or pitch motions, or to affect the longitudinal speed.

In relation to the above alternative embodiments, a parallelepiped architecture has been described for the casing of the propellant load but, as FIG. 9 shows, it is also possible, according to the invention, to use a loading (9) with several stages, of which three (a1, a2, a3 . . . ) are shown by way of example. It is also possible, if the propellant load lends itself to this approach, to choose a prismatic shape for this casing. The divergent part (21) in FIG. 9, given as an example, has the straight wall (34) of the combustion chamber working together with inclined planes (33) of the extruded nozzle center body (20). The angle ($\alpha$) is a function of the number of thrusters placed crosswise, and it demarcates the maximum width (a3) for the propellant load.

Finally, the different thrusters may be designed to have different shapes and sizes in the same support, without going beyond the field of the invention.

Figure 10:
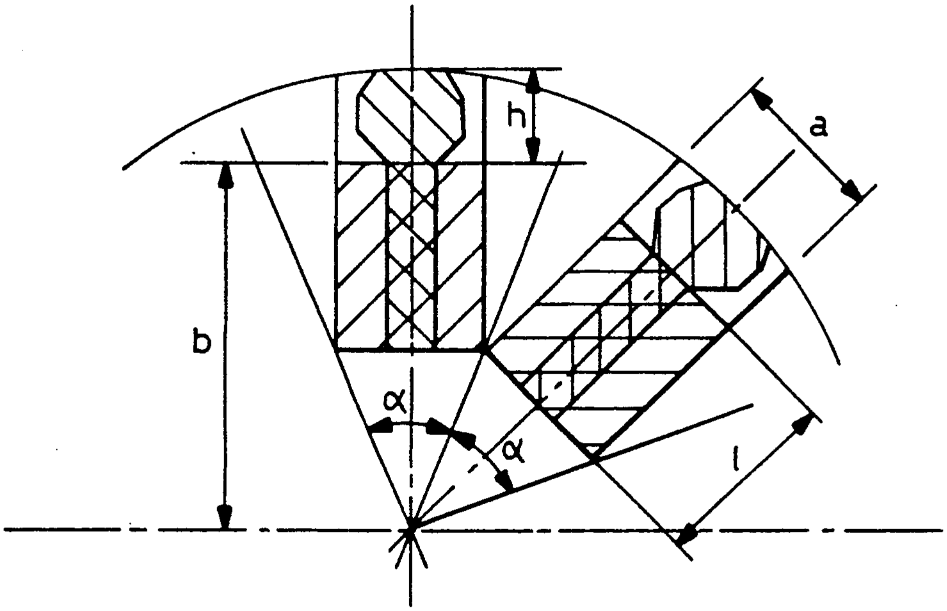
FIGS. 10 and 11 enable a better appreciation of the differences in volume between a standard loading of propellant and a loading according to the invention.
Figure 11:
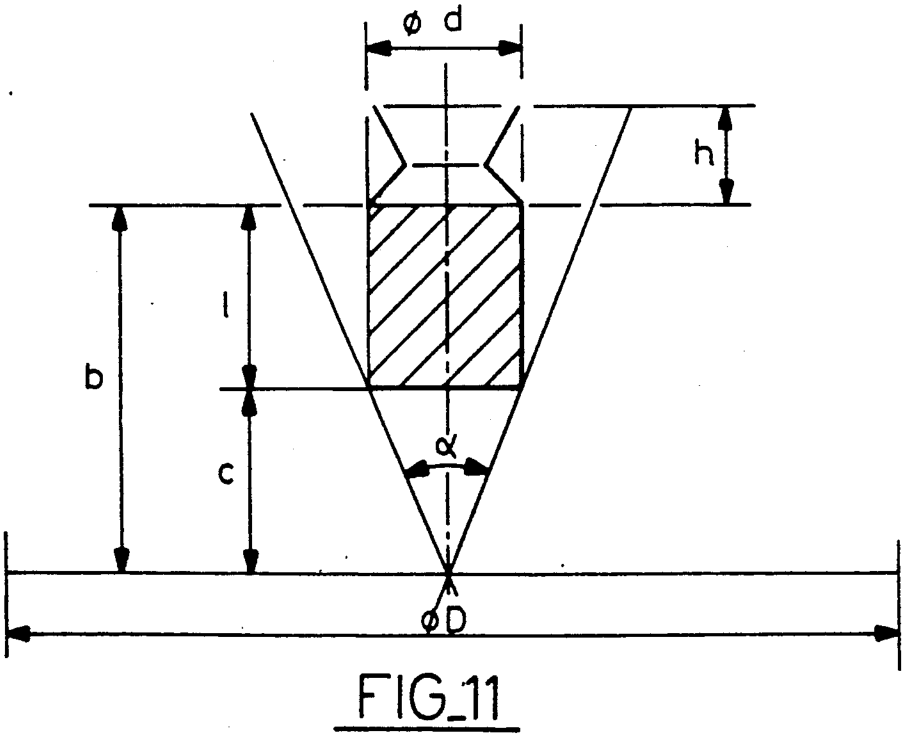

The positioning of thrusters according to the architecture in accordance with the invention, described above, enables a maximum propellant load to be obtained for a determined free volume, a load which is, in any case, significantly greater than that obtained by means of the cylindrical barrel thruster. For, the volume available for the loading of each thruster according to the invention is:

$$-v_1=e.a.l \text{ (FIG. 10);}$$

while this volume for a standard thruster is:

$$v_2=l.\pi/4.d^2 \text{(FIG. 11);}$$

(e) is the thickness of the section reserved, in the projectile, for the positioning of the thrusters;
(l) is the length of the propellant load;
(a) is the width of the parallelepiped shaped case;
(d) is the diameter of the cylindrical barrel in the standard example.

Assuming that the total space occupied by the nozzle (convergent/divergent) is identical in both cases, with an occupied- height (h), we get:

$$b=D/2-h \text{(D being the diameter of the projectile)}$$

$$l=b-c$$

$$c=d/2tg(\pi/2);$$

with $\alpha=2\pi/n$ (n being the number of thrusters) ·
if n=8, c=1.21d, or c=1.21a
and $l=b-1.21d$, or $l=b-1.21a$
whence $$V_1 a.l.e=a(b-1.21a)e$$

$$V_2=\pi d^2/4(b-1.21d)$$

$$V_1 max=0.207b^2e$$

$$V_2 max=7.95.10^{-2}b^3.$$

The ratio between these two maximum volumes:

$$R=\frac{V_1 \text{ max}}{V_2 \text{ max}}=2.63\ e/b$$

with e≧0.55 b. giving a ratio of about 1.45 for a projectile with a diameter such that (b) is equal to 13 centimeters. In this example, the maximum volume of the load in solid propellant is equal to 250 $cm^3$ for the architecture according to the invention, while it is only 174 $cm^3$ for standard architecture.

The invention can be applied to all types of projectiles requiring trajectory modifications by thrusters. It can be applied more particularly when the space set aside for these thrusters is too small for its use to be possible by standard means..

What is claimed is:

1. A device designed to modify the trajectory of a projectile by pyrotechnical thrusters, formed by several spaced thrusters, each of said thrusters containing a solid propellant load for forming combustion jets to give guidance thrusts that ensure that modification of the projectile trajectory, said thrusters being circumferentially arranged on a support shaped like a cylinder and centered with respect to a central axis of the projectile; wherein each of the thrusters positioned in a housing comprises a case with an interior surface, at least one face of which has a rectangular surface, said case containing a propellant load and an extruded nozzle center body connected to a rod going through the propellant load and fixed to the support, said extruded nozzle center body being spaced from said interior surface of said case for forming at least one nozzle enabling an orientation of a thrust.

2. A device according to claim 1, wherein said casing has a parallelpiped shape.

3. A device according to claim 2, wherein said case is a molded integral unit separable from said support.

4. A device according to claim 2, wherein the support comprises a roller secured by two flanges, said roller includes a cavity sized to correspond to said case, and said case is made of a heat resistant material.

5. A device according to claim 1, wherein the casing comprises several stages with widths ($a_1$, $a_2$, $a_3$).

6. A device according to claim 1, wherein the thruster is fitted with an electrical igniter comprising electrical conductors, the rod going through the propellant is a hollow member, the electrical conductors are lodged in the hollow part of the rod and the igniters are lodged in the extruded nozzle center body.

7. A device according to claim 1, wherein said nozzle formed between the extruded nozzle center body and the support has a diverging section, said diverging section being formed by a straight part of the extruded nozzle center body parallel to the rod and a chamfer made on the support.

8. A device according to claim 7, wherein said nozzle has a diverging section formed by the cooperation of two chamfers and made, respectively, on the case and on the extruded nozzle center body.

9. A device according to claim 7, wherein the diverging section has two disymmetrical parts, one formed by a chamfer working together with a straight part of the extruded nozzle center body, and the other formed by a straight part on the case side and by a chamfer made on the extruded nozzle center body.

10. A device according to claim 1, wherein an axis of the extruded nozzle center body is arranged perpendicularly to the central axis of the projectile.

* * * * *